United States Patent [19]

Mailliet et al.

[11] Patent Number: 4,574,494

[45] Date of Patent: Mar. 11, 1986

[54] DEVICE FOR DETERMINING THE PROFILE OF THE CHARGING SURFACE OF A SHAFT FURNACE

[75] Inventors: Pierre Mailliet, Howald; Emile Lonardi, Bascharage; Henri Radoux, Bereldange; Victor Kremer, Luxembourg, all of Luxembourg

[73] Assignee: Paul Wurth S.A., Luxembourg

[21] Appl. No.: 648,543

[22] Filed: Sep. 7, 1984

[30] Foreign Application Priority Data

Sep. 7, 1983 [LU] Luxembourg .......................... 84992

[51] Int. Cl.⁴ .............................................. G01B 5/20
[52] U.S. Cl. ...................................... 33/552; 33/126.6; 33/557
[58] Field of Search ................... 33/557, 560, 558, 561, 33/551, 552, 553, 554, 555, 126.5, 126.6, 126.7 R, 126.7 A; 266/92, 99

[56] References Cited

U.S. PATENT DOCUMENTS 2,316,955 4/1943 Handy ................................ 33/126.6
4,326,337 4/1982 Akimoto et al. ............... 33/126.6 X
4,515,350 5/1985 Shibata et al. ................. 33/126.6 X

FOREIGN PATENT DOCUMENTS 372935 4/1923 Fed. Rep. of Germany ..... 33/126.6

Primary Examiner—Harry N. Haroian
Attorney, Agent, or Firm—Fishman & Dionne

[57] ABSTRACT

An apparatus for determining the charging profile on the charging surface of a shaft furnace is presented. The apparatus consists of a plurality of level probes, each probe including a weight which is suspended vertically above the charging surface on the first end of a cable which projects from a supporting arm. The second end of each of these cables, in turn, is connected outside the furnace to respective winding drums, each drum being controlled by a driving device which raises or lowers the probe connected to the drum. This invention also consists of a monitoring device for measuring the unwinding of the cable from the drum and the descent of the probe onto the charging surface as well as a method of replacing an individual probe and its cable from outside the shaft furnace.

35 Claims, 21 Drawing Figures

U.S. Patent   Mar. 11, 1986   Sheet 1 of 8   4,574,494
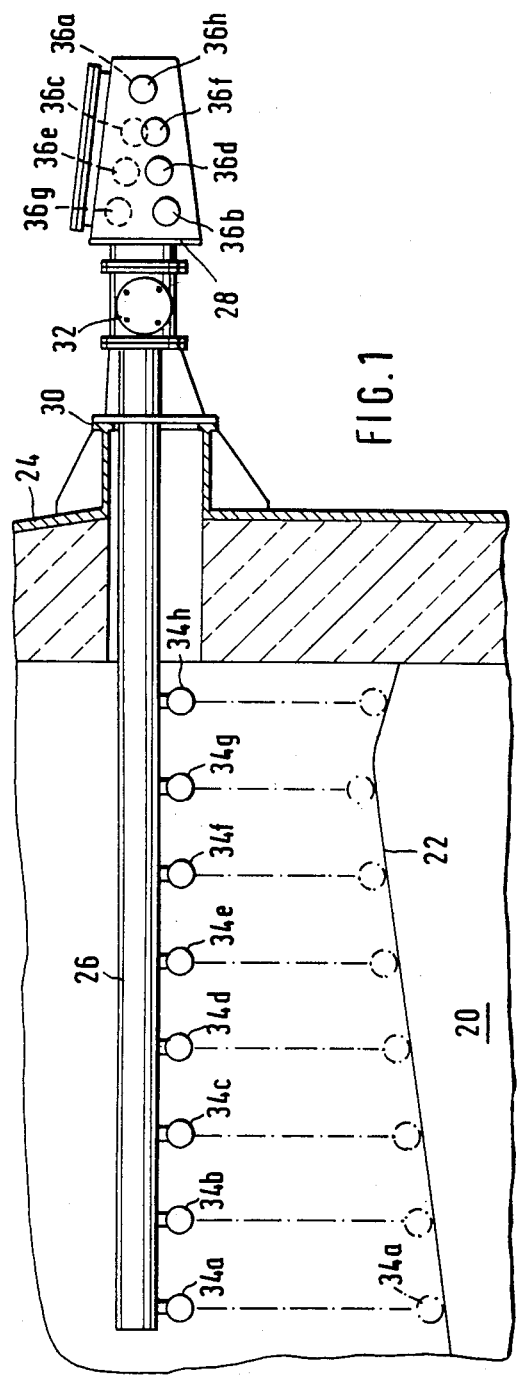
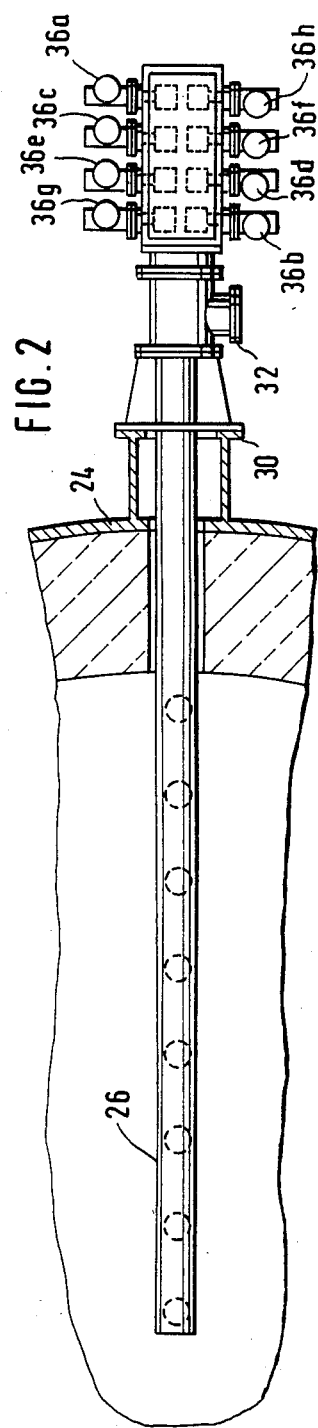

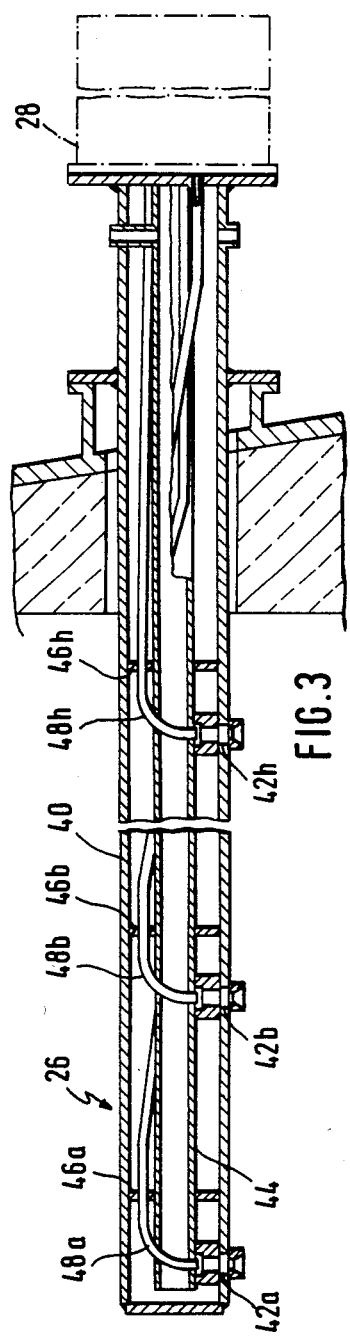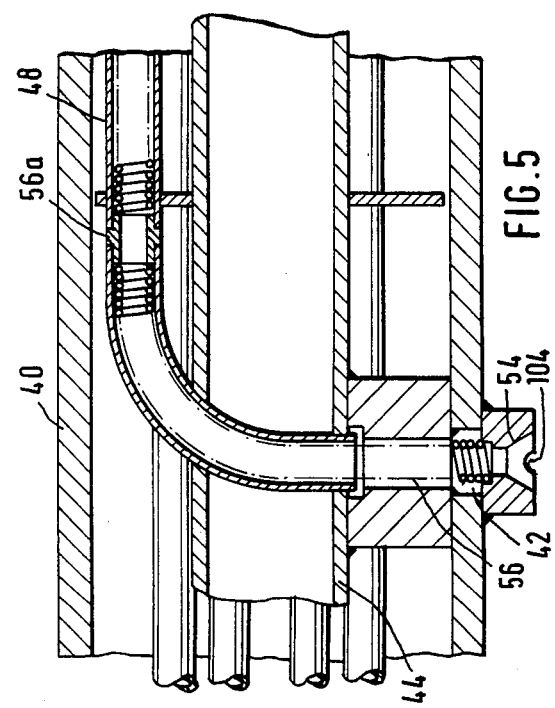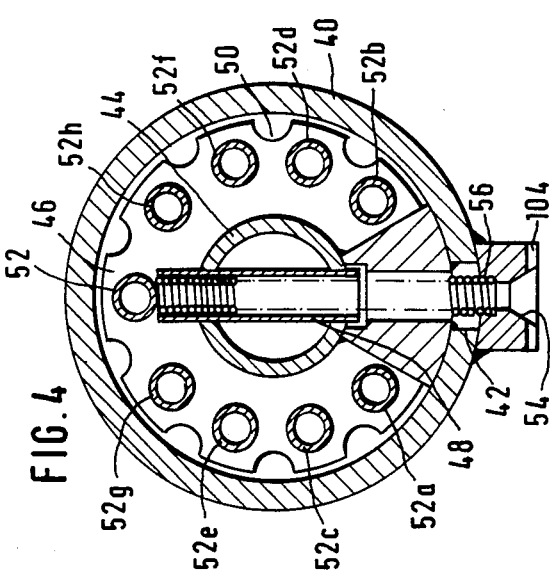

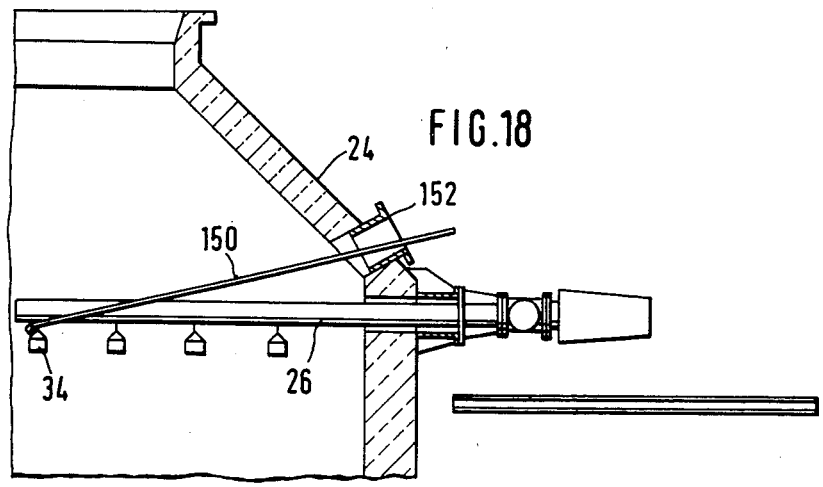
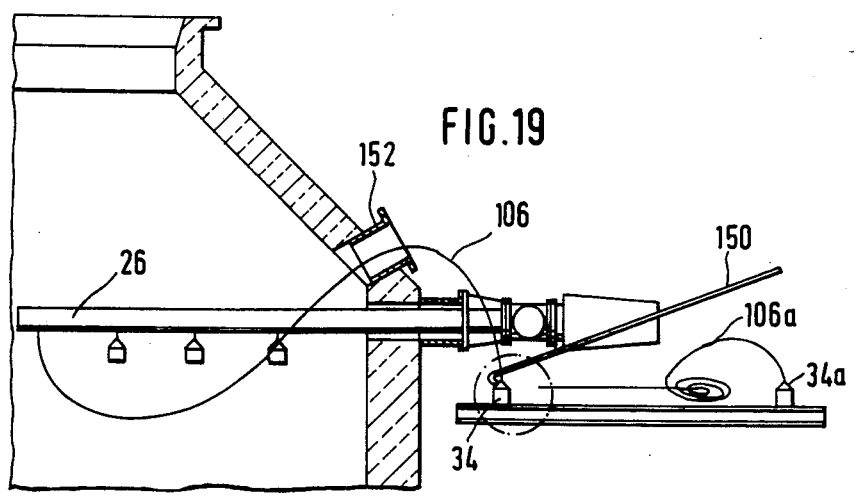
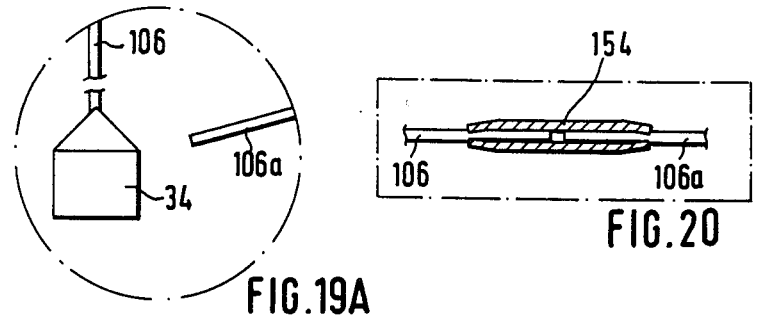

DEVICE FOR DETERMINING THE PROFILE OF THE CHARGING SURFACE OF A SHAFT FURNACE

BACKGROUND OF THE INVENTION

This invention relates to an apparatus for determining the charging profile on the charging surface of a shaft furnace. More particularly, this invention relates to an apparatus (profilometer) for determining the charging profile which consists of a plurality of level probes, each probe including a weight which is suspended vertically above the charging surface on the first end of a cable which projects from a supporting arm. The second end of each of these cables, in turn, is connected outside the furnace to respective winding drums, each drum being controlled by a driving device which raises or lowers the probe connected to the drum. This invention also consists of a monitoring device for measuring the unwinding of the cable from the drum and the descent of the probe onto the charging surface as well as a method of replacing an individual probe and its cable from outside the shaft furnace.

The profile of the charging surface of a shaft furnace, particularly a blast furnace, is currently determined or measured using essentially two factors. One of these factors is the distribution of charging material as it is introduced into the furnace and the second factor is the descent of the material within the furnace. It should be understood that the term "profile" indicates the particular surface configuration which the material being charged to a shaft furnace forms on the burden of the furnace.

Although it is extremely difficult, if not impossible, to control the descent of charging material in a shaft furnace, the relatively recent development of bell-less top type furnaces has made it possible not only to produce any desired distribution profile of charged material, but also, where appropriate, to correct or rectify the profile on the charging surface. As a result, a charging device in a bell-less top type shaft furnace offers the possibility of controlling the change in the profile of the charging surface during the operation of the blast furnace, provided that this profile can be determined. Accordingly, in order to control the profile of the charging surface of a shaft furnace of the bell-less top type, it is extremely important to provide an apparatus for determining the actual profile of the charging surface at any given point in time.

Unforunately, prior art profile determining apparatii have all suffered from various deficiencies and drawbacks. Typically, such charging surface profiles have been determined by an approximate estimate thereof, based on level measurements carried out along several different points in the shaft furnace by means of vertical mechanical probes mounted at one end of the furnace.

In an effort to improve such profile determinations, attempts have recently been made to develop radiation profilometers to obtain an acurate and complete reproduction of the profile over the entire charging surface. However, these radiation profilometers have not yet been developed to the stage were they can be efficiently used on an industrial scale due to serious problems caused by the severe conditions prevailing in the furnace and also due to the extremely high cost of such radiation devices.

As a result, those skilled in the art have attempted to improve prior art vertical level probes (discussed above) so as to obtain a better approximation of the charging profile German patent application Ser. No. A1-3,123,944 is an example of an improved device having multiple probes for simultaneously taking measurements at several points located on a radial line at the surface of the burden of a shaft furnace.

However, the device disclosed in the German patent application has been designed so as to operate with a single common drive mechanism for all of the individual probes and as a result, has been unusually difficult to manufacture. In fact, the numerous guide and return pulleys for the cables complicate maintenance and risk causing premature wear thereof. Moreover, raising the individual probes from the charging surface results in raising the loose pulleys before the probes are disengaged from the surface. This not only lengthens the duration of the measuring operation, but also forces the probes to rest on the material longer than is necessary (which may result in excellerated wear of the probes due to the extremely harsh conditions). Also, the many pulleys necessary for each individual probe makes the device of the German Patent Application very bulky and therefore undesirable.

SUMMARY OF THE INVENTION

The above discussed and other problems of the prior art are overcome or alleviate by the charging profile determining apparatus (profilometer) of the present invention. In accordance with the present invention, a new and improved apparatus for determining the charging profile of a shaft furnace comprises multiple probes for the simultaneous measurement of the charging profile at a series of points located on one or more radial lines along the burden the furnace The apparatus of the present invention does not have the numerous disadvantages of the above discussed charging device described in the German Patent Application or any of the other discussed prior art devices. The present invention has a construction which is simple, compact and relatively easy to maintain The charging profile determining apparatus in accordance with the present invention includes a supporting arm which consists of a sealed, preferably cylindrical sleeve having a plurality of orifices on the lower face thereof for the passage of cables therethrough, each cable having a probe attached to one end thereof. The sleeve interior contains a series of guide tubes which connect each of the orifices to an external control unit, the control unit comprising a series of winding drums and associated driving means equal to the number of cables and guide tubes. Plural struts are arranged in the sleeve for rigidly retaining the tubes in a selected position. One or more cooling circuits which extend over the entire length of the interior of sleeve and around each of the guide tubes.

An important feature of the present invention is that each drive means comprises an electric motor which acts on the shaft of each winding drum and is associated with a torquemeter for measuring the torque reaction. Another feature of this invention is that each probe is associated with at least one device for damping the shocks when the probes are raised. In accordance with a preferred embodiment of the present invention, the device for damping the shocks comprises an elastic connection between each winding drum and its drive shaft, the drive shaft being actuated by the associated electric motor.

The above discussed damping device may be supplied with or, if appropriate, replaced by a double electrical supply to the motor, one supply being at the normal mains frequency and the other supplied via a frequency divider common to all the motors, each motor being connected to the frequency divider automatically by means of a limit detector.

Preferably, the sleeve includes, at the level of each orifice, a receiving cup for receiving the weight portion of each probe. This cup is preferably mounted on the sleeve via elastic means so as to dampen the force caused by receiving the weights.

In accordance with the present invention, the guide tubes are twisted within the sleeve so as to take on the configuration of two groups of tubes arranged symmetrically on either side of a mid-plane of the sleeve at the entrance of the control unit. These twists also serve the purpose of changing the direction (in the vicinity of the orifices and receiving cups) of the guide tubes along the side of the sleeve which is diametrically opposite that of the orifices, before passing perpendicularly through the latter, and at the same time forming a bend of 90°. In accordance with a preferred embodiment of the present invention, the guide tubes are internally provided with a coiled helical wire within which the cable passes. This coiled wire reduces wear of the guide tubes as well as reducing the wear of the cable. Moreover, the coiled wire can easily be exchanged after it has been worn.

Each guide tube preferably communicates with a tank containing a pressurized scavenging gas, this pressure being higher that the control unit and which, in turn, is higher than the pressure in the shaft furnace Preferably, each winding drum is associated with a cable-slack detection system so as to prevent the cables from becoming entangled in the event of a breakdown.

The present invention also includes a method of replacing a probe and its cable while the apparatus is mounted within the 10 shaft furnace. This method comprises providing a hooking device to hook the probe from outside the furnace and thereafter extracting the probe and cable. At that point, the cable is severed immediately above the probe and a new cable is fastened to the end of the severed cable (the other end of the new cable being connected to a new probe). The old cable is then wound onto the winding drum until the location of the fastener to the new cable appears near the drum. Finally, the old cable is removed from the drum and the new one is fastened thereto. The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures:

FIG. 1 is a side elevation view of the charging profile determining apparatus of the present invention after being mounted within a shaft furnace;

FIG. 2 is a plan view of the charging profile determining apparatus of FIG. 1;

FIG. 3 is a cross-sectional elevation view of the determining apparatus of FIG. 1 showing the arrangement of guide tubes within the sleeve thereof;

FIG. 4 is an enlarged cross-sectional elevation view of the sleeve at the level of an orifice;

FIG. 5 is an enlarged cross-sectional longitudinal view of a portion of the sleeve at the level of an orifice;

FIG. 18 is a diagrammatic view of a first step of a method replacing the cables used in accordance with the present invention;

FIG. 19 is a diagrammatic view of a second step of a method used in replacing the cables of the present invention;

FIG. 19(a) is an enlarged view of a portion of FIG. 19;

FIG. 20 is a cross sectional elevation view of another step in a method in replacing the cables used in accordance with the present invention.

DESCRIPTION OF THE PREFERRED EMBODIMENT

Figure 8:
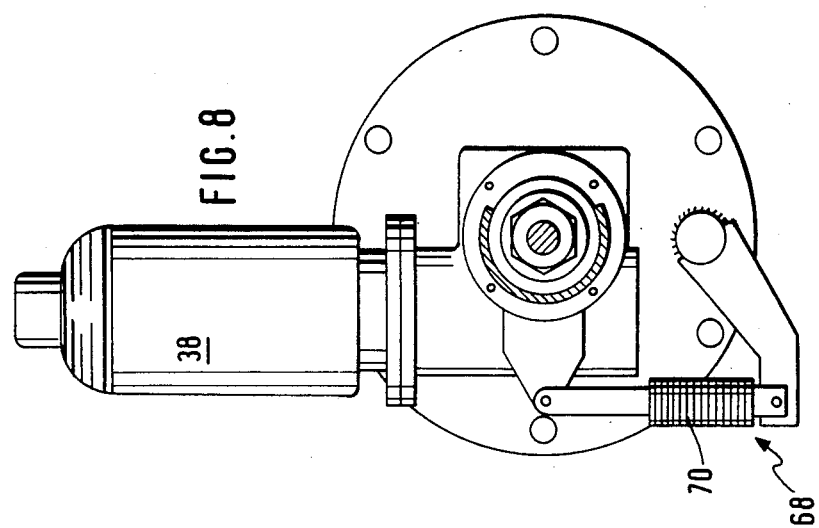
FIG. 8 is an elevation view along the line VIII-VIII of FIG. 6.

Referring first to FIGS. 1 and 2, an apparatus for measuring or determining the profile of charging material in a shaft furnace is shown. The apparatus generally comprises eight individual probes for simultaneously measuring the height or level of charging material 20 along eight points of the charging surface located in a shaft furnace, the wall of which is designated by 24. These eight measuring points make it possible to carry out a sufficiently accurate evaluation of the curve 22 representing the profile of the charging surface in the furnace.

The measuring apparatus of the present invention is horizontally and radially positioned through wall 24 into the central region of the furnace, and is supported thereon by means of a flanged connection 30 on the outer casing of wall 24. The portion of the present invention located within the furnace consists essentially of a supporting arm 26 overhanging the charging surface and carrying a plurality of individual probes the probes, consisting of weights 34a, 34b, 34c, 34d, 34e, 34f, 34g and 34h which are connected, via arm 26, by means of cables (not shown), to an external control unit 28. Between control unit 28 and connection flange 30, an orifice 32 for allowing cable inspection is preferably provided.

The cables (having the weights 34a to 34h attached thereto) are each connected, within the control unit 28, to a winding drum designated by the reference symbols 36a, 36b, 36c, 36d, 36e, 36f, 36g and 36h. Measurements are taken when the drums 36 are unwound so as to lower weights 34 onto the charging surface of the shaft furnace from the position represented by the unbroken lines into the position represented by the broken lines in FIG. 1. The length of the unwound cable provides an indication of the level of the charging surface of the measuring point in question. The unwinding and winding of the cable by means of drums 36 are carried out by means of motors 38a, 38b, 38c, 38d, 38e, 38f, 38g and 38h associated, respectively, with each of the drums 36a to 36h.

It will be appreciated to those skilled in the art that the use of eight individual probes as shown in FIGS. 1 and 2 is by way of example only and may be modified in accordance with the diameter of the furnace and the accuracy of the measurements to be made, the actual number of probes being increased or reduced, as is necessary.

Referring now to FIGS. 3 to 5, enlarged details of the structure of the supporting arm 26 are shown. Support arm 26 consists of a closed sleeve 40, which is preferably cylindrical and which is provided on the lower side thereof with a series of orifices or openings 42a 42h for the passage of the cables to which the weights 34 are attached. Provided within sleeve 40 is a coaxial tube 44, through which a cooling fluid (i.e., water) passes. This cooling fluid thereafter returns via the annular spaces between tube 44 and the sleeve 40 (see FIG. 4).

A series of cable guide tubes 48a 48h for retaining the cables respectively connect each orifice 42a, 42b, 42h to the control unit 28 outside the furnace. The plural cable guide tubes 48 pass through the annular hollow space between the sleeve 40 and the coaxial tube 44 in a position transversely opposite orifices 42. Guide tubes 48 are preferably retained in place within sleeve 40 by means of a series of annular struts 46a, to 46h disposed near orifices 42 between the tube 44 and the sleeve 40.

Struts 46 preferably have peripheral cut-outs sections 50 (see FIG. 4) which allow the cooling liquid to pass therethrough. Struts 46 also possess opening 52 for the passage of the cable guide tubes 48. It will be appreciated that struts 46 may be identical or may only have the number of openings 52 equal to the number of guide tubes 52 which pass at that point along sleeve 40. For example, strut 46a may have only one opening 52a, strut 46b having two openings 52a and 52b, and so forth, up to strut 52h which will have eight opening 52a, 52b, 52c, 52d, 52e, 52f such as the strut 4b shown in FIG. 4.

As shown in FIG. 3, tubes 48 attach perpendicularly onto the associated orifices 42 by means of a 90 degree bend. In an effort to make the radius of curvature of this bend as large as possible, the bend should pass through central tube 44 such that tubes 48 all pass through the associated struts 46 on the side opposite that of the orifices 42 (i.e., upper side). Because all these tubes 48 pass through the struts 46 on the upper side, they must be twisted in the annular space between the tube 44 and the sleeve 40 to allow all the tubes 48 to emerge therefrom. This twisting of tubes 48 (see FIG. 3) is preferably provided such that all the tubes take on a configuration at the entrance of control unit 28, of two groups of four tubes located on either side of a mid-plane. This distribution is illustrated in FIG. 4 by the numbering of the orifices 52, that is, tubes 48a, 48c, 48e and 48g are respectively located on a side opposite tubes 48b, 48d, 48f and 48h which are located on the opposite side to the entrance of the control unit 28. It will be appreciated that if the number of guide tubes is less than or greater than eight, alternative distributions of tubes will be employed.

As shown in FIGS. 4 and 5, each orifice 42 of sleeve 40 is provided with a cup 54 for receiving the weights 34, the shape of the cup 54 matching the shape of the weights 34, so that the orifice 52 is blocked when the weights are in a raised position, thereby preventing dust from penetrating into tubes 48.

In order to reduce the wear of the cables and prevent the wear of the tubes 48 at the level of the bends and twists, a helical spring wire 56 is provided within guide tubes 48 which allows the cables to easily pass through the turns. The spring wires 56 are introduced into the tubes 48 as shown in FIG. 5. It should be noted that coiled wire 56 becomes worn less quickly than the tube 48, and moreover, even when it is worn, it can be easily replaced (without replacing the entire guide tube 48). To make it easier to replace wire 56, it is preferably provided in two parts, the parts being separated by an intermediate bushing 56a.

Figure 6:
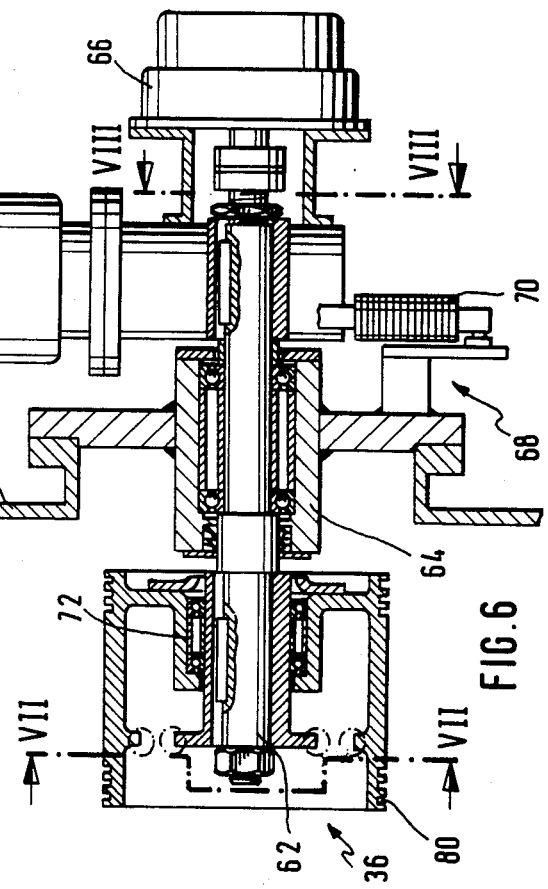
FIG. 6 is an enlarged cross-sectional elevation view of the determining apparatus of FIG. 1 through a winding drum and its associated drive mechanism.

The winding and unwinding of each cable will now be described with reference to FIGS. 6–8. Drum 36 is mounted on a shaft 62 rotatably positioned in a bearing 64 of the housing 60 of the control unit 28. Outside housing 60, an electric motor 38 for driving shaft 62, for example by means of a worn gear (not shown) is provided also. Outside housing 60, a device 66 for detecting the position and angular speed of the drum 36 is similarly provided.

To ensure proper rotation of shaft 62 under the action of motor 38, that is, to prevent motor 38 from rotating about shaft 62, motor 38 should be connected to housing 60 in one way or another. This connection is preferably effected by means of a torquemeter 68 connected between housing 60 and motor 38. Torquemeter 68 may consists of a simple piezo-electric transducer 70 which measures the reaction of the back-geared motor assembly 38 exerted by the torque transmitted from the weight of the probe to the drum along the shaft 62. This transducer automatically controls the stopping of the motor 38 when the torque reaches a predetermined upper threshold corresponding to the complete raising of weight 34 and when the torque reaches a predetermined lower threshold corresponding to the moment when the weight 34 touches the charging surface during the unwinding of the cable.

Drum 36 is mounted on shaft 62 by means of a bearing 72. The dynamic connection between the drum 36 and its shaft 62 is made by means of an elastic connection shown in FIG. 7. This connection comprises two blades 72a and 72b integrally attached to shaft 62 and communicating with two stops 74a and 74b on the inner face of the drum. When the shaft 62 is driven in a trigonometric direction, blades 72a and 72b drive drum 36 directly as a result of their action on stops 74a, 74b. The ends of blades 72a, 72b are also each connected to drum 36 by means of compression springs 76a, 76b. These springs are sufficiently strong to drive drum 36 when the blades 72a, 72b rotate in a clockwise direction. In contrast, when the weight reaches the upper stopping point, the drum is locked by means of its cable wherein springs 76a, 76b dampen the shock of stopping under the effect of their compression. In fact, this stopping of the shaft 62, controlled by the torquemeter 68, necessarily occurs only a few moments after the drum has stopped, because it is only the increase in torque which controls this stopping.

In order to dampen the active forces attributed to the inertias of the moving masses, the present invention provides means for reducing the rotational speed of the probes when they are being raised (especially near the end of travel). For this purpose, two different powers supplies are provided for the motors 38. One of these is the so-called normal supply which is a direct connection to the mains, this being a 50 Hertz alternating current supply. The second supply is provided via a frequency divider which reduces the frequency of the alternating current of the mains from 50 Hertz to, for example, 10 Hertz. A single frequency divider is sufficient for all the motors 38a-38h. If the frequency of electrical supply of the motors is divided by five, the rotational speed of the drums 36 is likewise divided by five, while the work necessary for compensating the forces of inertia is reduced to The motors are switched from the normal mains supply to the frequency divider automatically by means of a switch, under the control of detection device 66. This switching is done in at a predetermined angular position of the drum 36 corresponding to a predetermined distance of the weights 34 before the upper stopping point.

Detection device 66 preferably comprises a pulse generator as well as a detector and pluse counter. Such a generator is well known and generates a particular number of pulses by optical, mechanical or electrical means. For example, the generator may generate fifty pulses, at each rotation of shaft 62. The pulses generated in this way are added in a counter, such that a specific length of unwound cable, that is, a specific position of weight 34, corresponds to each total. This information provided by the pulse counter is analyzed by microprocessors in a data processing installation.

Figure 7:
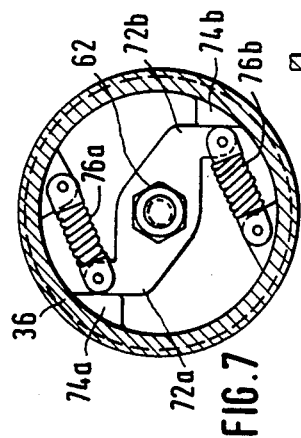
FIG. 7 is a cross-sectional elevation view along the line VII—VII of FIG. 6.

Apart from the elastic connection illustrated in FIG. 7, there are alternative means for damping the stopping shocks. For example, a spring may be provided at the level of each of the orifices 42, in order to damp the shock of each of the weights 34 against the cups 54, this being done in combination with the reduction in speed, as described above.

In accordance with the present invention, incorrect measurements due to an irregular winding of the cables on the drums 36 are avoided by means provided to ensure that, when a weight has been raised completely, the cable covers the entire width of drum 36. Accordingly, a helical groove 80 for receiving the cable is provided on the outer surface of each drum 36.

An example of an embodiment of a probe in accordance with the present invention and, as described above, is as follows:
Power of the electric motor : 250 watts
Frequency of the supply current : 50 Hertz or 10 Hertz
Circumference of the drum : 50 centimeters (diameter approximately 16 centimeters)
Rotational speed of the drum : 1 revolution per second
Cable winding capacity : 8 meters
Speed of the cable :
 1) at 50 Hertz : 50 cm per second
 (2) at 10 Hertz : 10 cm per second If the pulse generator in the detection device 66 generates 50 pulses at each revolution of the drum, each pulse represents a length of unwound or wound cable of one centimeter. In other words, the measuring accuracy of the probe is of the order of one centimeter.

It will be appreciated that instead of providing a frequency divider which is common to all of the motors, it is also possible to provide a separate frequency divider for each motor.

The data given above shows that the charging profile measuring apparatus of the present invention, although very compact in size, is simple, highly effective and accurate in its measurements.

It is possible to combine the profilometer of the present invention with conventional thermal-measurement and gas-sampling probes. Such a combination is easily effected by slightly modifying the design and structure of supporting arm 26 so as to incorporate the necessary thermocouples and gas-sampling tubes therein as described in patent application EP-AP-0,056,943.

It is also possible to provide, within each of the weights 34, acoustic transducers electrically connected via the cables to suitable detectors outside the furnace, in order to measure, for example, the noises at the charging surface or the impact of the weights on the charging material. Such noises may be used to obtain information regarding the nature and granulometry of the materials present at the various measuring points. Furthermore, it is possible to combine pressure-measuring means with each of the probes, in order to ascertain the distribution of pressure over the cross-section of the furnace.

Figure 9:
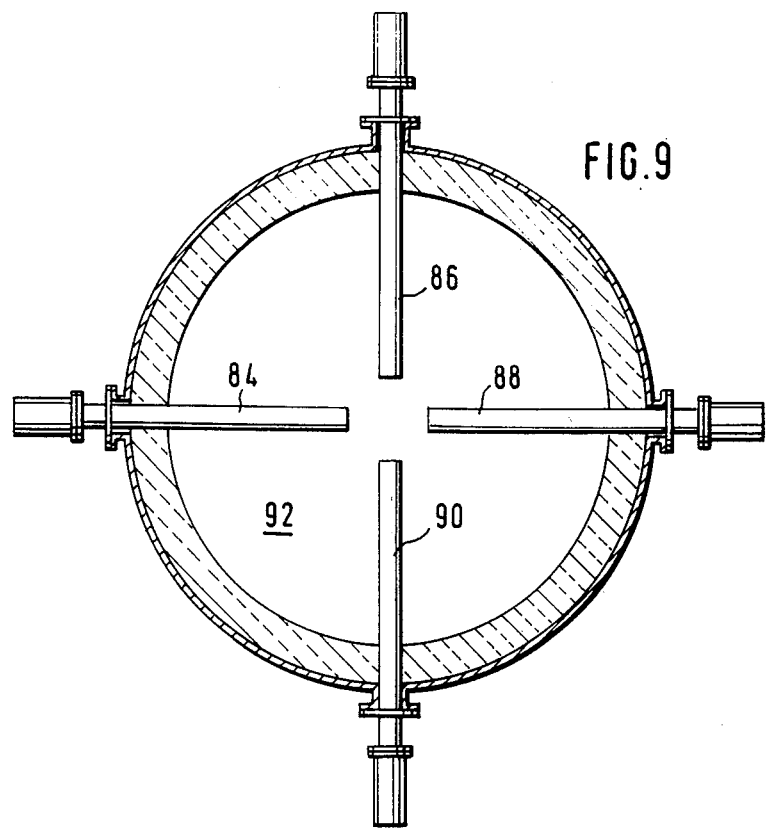
FIG. 9 is a plan view showing an arrangement of several charging profiles determining apparatii arranged within a shaft furnace in accordance with the present invention.

FIG. 9 diagrammatically illustrates four probes 84, 86, 88 and 90 arranged in the form of a cross above the burden of a shaft furnace 92. These probes 84, 86, 88 and 90 can all be profilometers, such as those described above, or profilometers combined with thermal probes, with gas-sampling or, for example, two profilometers 84 and 88 and two thermal and gas-sampling probes 86 and 90 or any other suitable combination.

Figure 10:
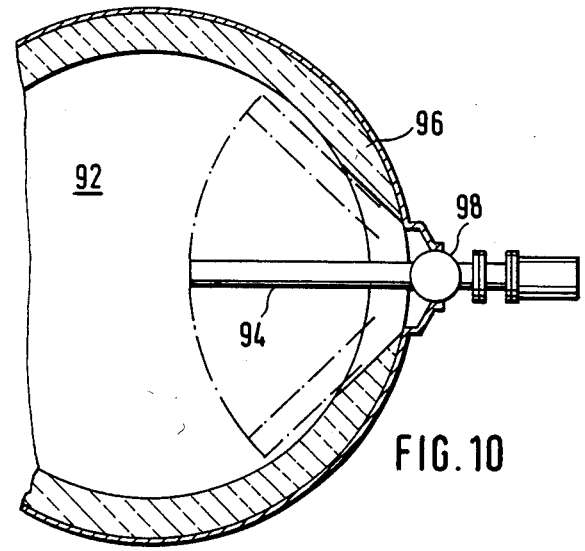
FIG. 10 is a plan view showing a pivotable charging profile determining apparatus in accordance with the present invention.

Alternatively, the measuring devices of the present invention may be pivotally mounted on the wall 96 of furnace 92, as shown in FIG. 10. In the illustrated embodiment, supporting arm 94 is mounted by means of a universal joint 98, such as the joint described in Patent Application EP-A1-0,045,098, thus allowing it to be pivoted horizontally between the two extreme positions shown by the broken lines. This enables the probe 94 to be displaced from an operative measuring position, shown by the unbroken lines, towards one or the other of the "parking" positions shown by dot-and-dash lines. In this way, the supporting arm 94 will not impede the charging of the furnace and will not expose it to the falling material. In addition, such a pivoting probe allows profile measurements to be carried out not only in the extreme positions, but also in any intermediate angular position. In other words, measurements can be made not only in a radial position, but also in any other direction. Because several pivoting probes may be provided, for example four, as shown in FIG. 9, virtually the entire charging surface can be measured and it is thus possible to obtain a mosaic of measuring points which provides an indication of the charging profile of the entire upper surface.

The possibility of pivoting the arm into a "parking" position offers an additional advantage for charging devices of the bell-top type in that the presence of the supporting arm in the path of the falling material may produce a "trench" in the charging surface and thereby falsify the results of the level measurement. This risk is not present with charging devices of the bell-less top type having a delivery means wherein the path of the falling material is helical and wherein a trench will not be located just beneath the supporting arm.

It will be appreciated that instead of horizontal pivoting of the arm, it is also possible to provide vertical pivoting. This is particularly advantageouse when the present invention is combined with thermal and gas measurements (as discussed above) since in this case, for the purpose of these measurements, the arm should be arranged as parallel to the charging surface as is possible.

To prevent dust from rising through tubes 48 up to the control unit 28, it is preferable to provide within the latter an excess pressure $p_1$ relative to the pressure prevailing inside the furnace.

Moreover, in accordance with a particularly preferred embodiment of the present invention, in addition to the excess pressure provided in control unit 28, additional scavenging gas is provided to each of the individual cable guide tubes 48. Thus, as shown in FIG. 11, at the level of one of the flanges 100 of orifice 32, a supply 102 of scavenging gas is provided at a pressure p wherein $= p_f + p_1 + p_2$, $p_f$ being the pressure prevailing in the furnace, $p_1$ being the excess pressure in the control unit 28; and $p_2$ being the excess pressure of the scavenging gas in relation to the pressure in the control unit 28.

The excess pressure $p_1 + p_2$ relative to the pressure in the furnace ensures that the scavenging gases are circulated through tubes 48 into the furnace. To allow the tubes 48 to be scavenged when the probes have been raised, cups 54 (see FIG. 5) are preferably provided with lateral cutouts 104 for the escape of the scavenging gases.

Figure 11:
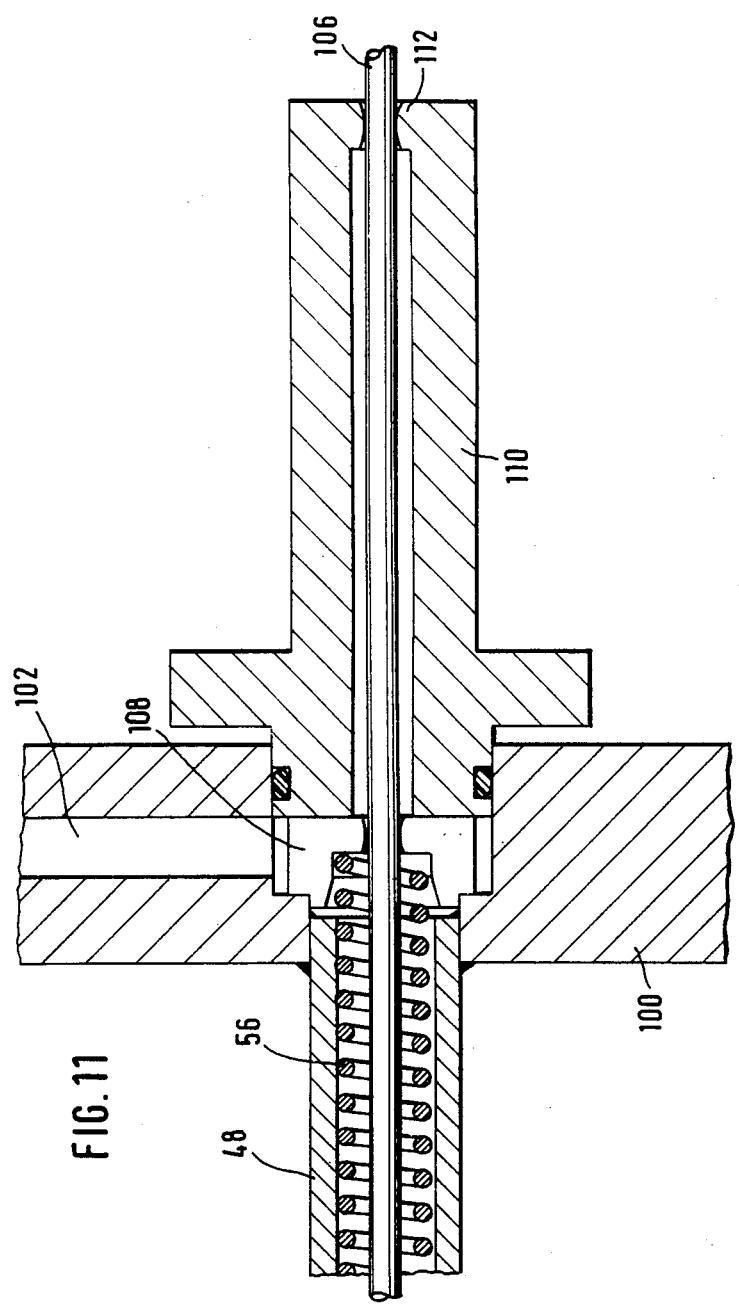
FIG. 11 is an enlarged cross-sectional elevation view of a system for providing scavenging gas to a guide tube in accordance with the present invention.

As shown in FIG. 11, the scavenging gas 102 is admitted into each of the tubes 48 via a washer 108 which locks the spring wire 56 surrounding each cable 106 and which has diametral slits for the passage of the gases.

Because the pressure of the scavenging gas is not only higher than the pressure prevailing in the furnace, but also higher than the pressure in control unit 28, the scavenging gas preferably should travel towards the latter, especially since the tubes 48 also provide a certain resistance to the passage of the scavenging gases. To force the scavenging gases to flow into tubes 48, a cylindrical bush 110 intended to create an artificial load loss is mounted on the flange 100 around each of the cables on the side opposite tubes 48. This load loss is created because the cross-section of the bore of bush 110 is less than the inner cross-section of wire 56, and because the bore of the bush is delimited on either side by a throttle produced at one end by the washer 108 and at the other end by a narrowing 112 of the bush 110.

It is possible, by modifying their length, to match the load loss of each of the bushes 110 to the load losses caused by the different lengths of each of the tubes 48. It is also possible to connect each of the tubes 48 to separate sources of scavenging gas, the excess pressures $p_2$ of which match the different lengths of the tubes.

During the unwinding of cables 106, a possibility exists for accidental entanglement of the cables should a breakdown occur in the limit detector or if the cables 106 jam in the cable guide tubes 48. Accordingly, FIGS. 12 and 13 show a first embodiment of cable-slack detection system to avoid such accidental entanglements.

This system consists of rocker levers 114 suspended above each drum 36 with a pivoting axis 116 parallel to the axis of the drum. Levers 114 are actually plates having a width which corresponds to the width of the drums 36 and one of the ends of which is normally trangential to the upper face of the drum, while the opposite end thereof is associated with a circuit breaker 118. During normal operation, the system occupies the position of FIG. 12. However, when the unwinding of cable 106 does not follow the desired movement generated by drum 36, what is known as a "cable slack" 106' is formed as shown in FIG. 13. This cable slack 106' causes lever 114 to rock and actuates the circuit breaker 118 which, in turn, immediately controls a reversal of the direction of rotation of the drum 36 so as to wind up the cable 106 and raise the weight.

Figure 13:
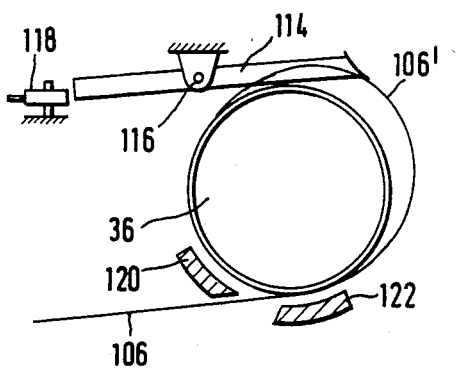
FIG. 13 is a diagrammatica view showing the mode of operation of the cable-slack detection system of FIG. 12.

To prevent the cable slack from occuring in other locations along the drum, that is, to ensure that it occurs only in the region 106' shown in FIG. 13, two guide plates 120, 122 are provided in the lower region of drum 36 to cause lever 114 to rock. These plates also serve to force the cable 106 to penetrate into the helical groove 80 (see FIG. 6) of the drum.

Figure 12:
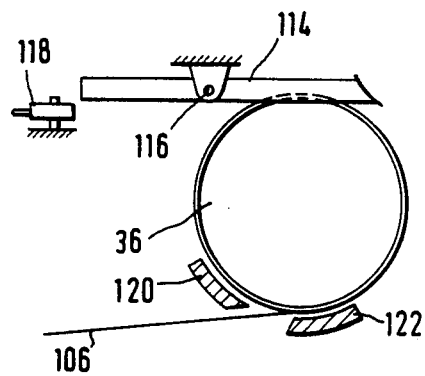
FIG. 12 is a diagrammatic view showing a cable-slack detection system which can be used in conjunction with the charging profile determining apparatus of the present invention.

The rocker-lever system of FIGS. 12 and 13 can be replaced by a proximity detector which is mounted near the surface of the drum, in the region in which the cable slack 106' occurs, and which detects the lifting of the cable 106' from the drum 36 so as to control the reversal of the direction of rotation of the drum 36. Such a detector can be a photo-electric cell or an electrical detector, such as, for example, an induction detector.

Figure 14:
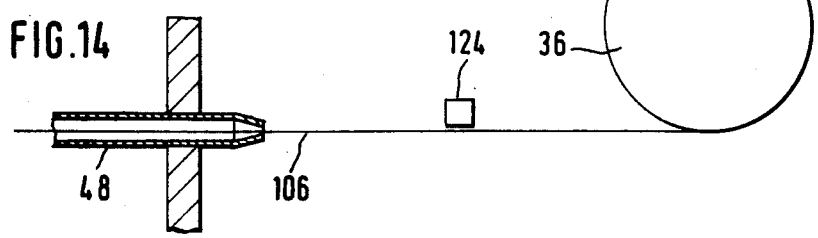
FIG. 14 is a diagrammatic view showing an alternative embodiment of a cable-slack detection system used in conjunction with the charging profile determining apparatus of the present invention.
Figure 15:
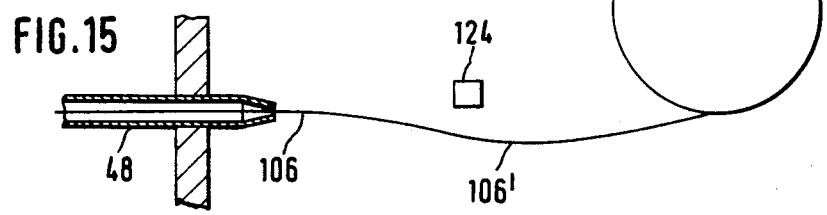
FIG. 15 is a diagrammatic view showing the mode of operation of the cable-slack detection system of FIG. 14.

FIGS. 14 and 15 show a second embodiment of a cable-slack detection system in accordance with the present invention. This system comprises a detector 124 which is located between the drum 36 and the corresponding tube 48 or bush 110 and which extends over that surface of the drum 36 necessary for covering the winding surface thereof. Detector 124 is inoperative when the tension of the cable is normal, as shown in FIG. 14. However, when cable 106 is relaxed, as shown in FIG. 15, detector 124 immediately controls the reversal of the direction of rotation of the drum 36. Detector 124 can be a proximity detector of the type described above or a detector with an electro-mechanical circuit breaker, the control member of which is in contact with the cable during normal operation, as shown in FIG. 14.

Figure 17:
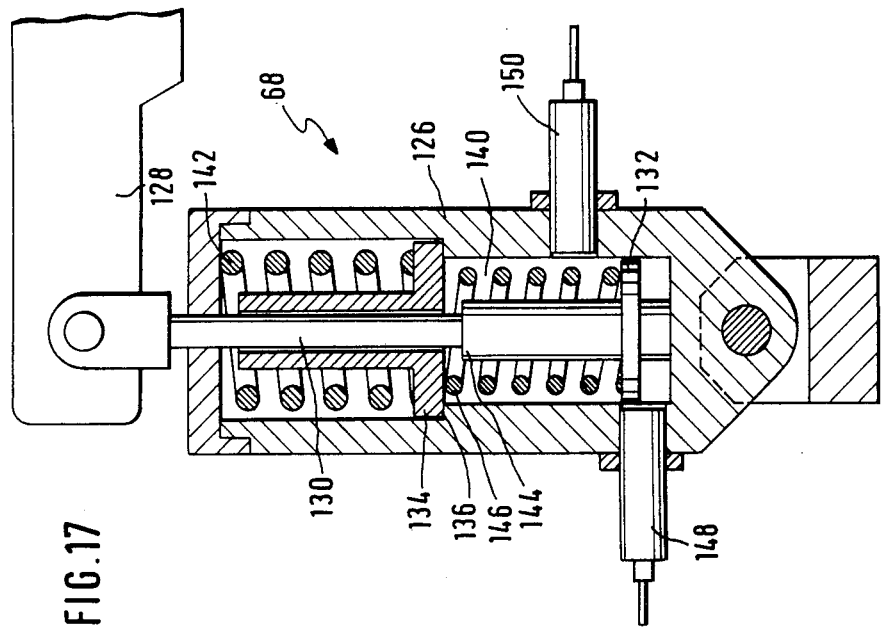
FIG. 17 is a cross-sectional elevation view of the torquemeter of FIG. 16.
Figure 16:
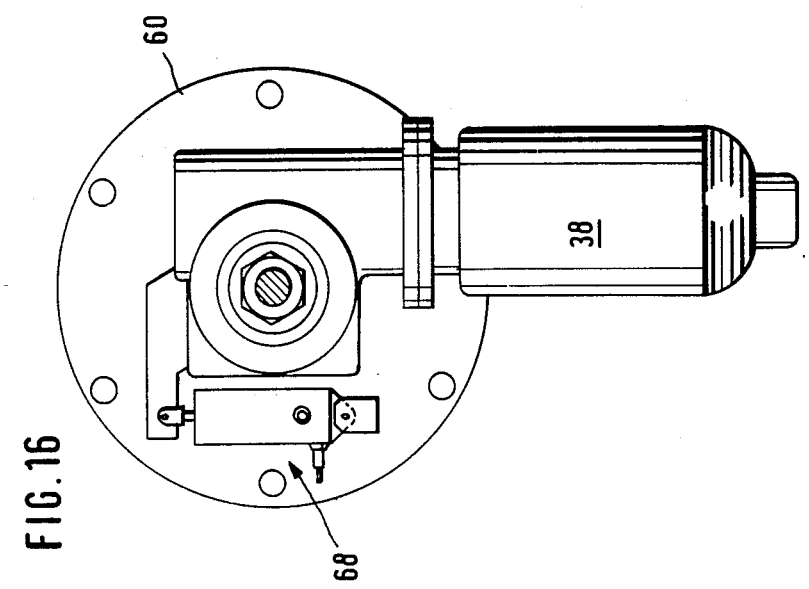
FIG. 16 is a elevation view showing a torquemeter associated with a motor for unwinding cable used in conjunction with the charging profile determining apparatus of the present 10 invention.

FIGS. 16 and 17 illustrate a particularly advantageous embodiment of a torquemeter 68 used for detecting the moment when the torque reaches an upper threshold corresponding to the locking of the probes 34 into the cups 54, and the moment when the torque reaches a lower threshold corresponding to the moment when the probe touches the charging surface.

In FIG. 16, torquemeter 68 is mounted in the same way as the piezo-electric transducer 70 of FIG. 8. Torquemeter 68 comprises a hollow cylindrical housing mounted between the housing 60 on one side and, on the opposite side, a lever 128 integral with the motor unit 38. The connection with this lever 128 is made by means of a piston rod 130 and a first piston 132 sliding relative to the housing 126 or vice versa.

Surrounding rod 130 and coaxial therewith is a second piston 134. The inner wall of the housing 126 includes a circular shoulder 136 defining an upper chamber 138 and a lower chamber 140 having a smaller diameter than chamber 138. Upper chamber 138 is provided with a compression spring 142, the action of which normally keeps piston 134 bearing up against shoulder 136.

Piston rod 130 also includes a circular shoulder 144 between the upper portion of rod 130 (of thinner cross-section) and the lower portion in the chamber 140 (of a wider cross-section). An additional compression spring 146 is located in chamber 140 and is stretched between the two pistons 132 and 144. Finally, two detectors 148, 150 are mounted in a housing 126 in a lower portion of the chamber 140. These detectors are actuated by the presence and the sliding of the piston 132.

The force of spring 146 is less than the force resulting from the weight of the probe, while the force of spring 142 is greater than the force resulting from the weight of the probe. In other words, in the unstressed state, the two springs 142 and 146 keep the pistons 132 and 134 in the positions shown in FIG. 17.

In contrast, when the torquemeter is subjected to the action of the weight of the probe, as occurs during measurement (i.e., during the winding and unwinding of a cable and the raising and lowering of a probe on the charging surface), it receives a force greater than the force of the first spring 146. As a result of this, piston 132 slides in housing 126 against the action of spring 146, which is compressed until shoulder 144 bears on piston 134. It is not possible for the piston 134 to slide to a greater extent against the action of the spring 142 as a result of displacement, because the force of the spring 142 greater than the force of the weight of the probe. In this position, piston 132 is located exactly between the two detectors 148 and 150, so that is is not detected by either of these.

When the probe touches the charging surface during the descent, and the action of its weight on the torquemeter diminishes, then the force of spring 146 acts to push the piston into the position illustrated in FIG. 17. In this position, piston 132 is detected by detector 148 which immediately controls the stopping of the unwinding operation and the recording of the unwound length. When measurement is completed, the probe is raised so that the piston again assumes a neutral position between the two detectors.

At the end of travel, when the probes are stopped in the cups of the supporting arm, the torquemeter 68 receives, in addition to the action of the weight of the probes, the counter-reaction of the locking of the weights. This force is sufficient to displace the piston 132 beyond the neutral position as a result of displacement of the piston 134 and compression of the spring 142, until the sleeve of the piston 134 comes up against the housing. In this position, piston 132 is detected by the detector 150 which immediately controls the stopping of the winding of the cable.

Referring now to FIGS. 18-20, a preferred method of replacing a defective cable and/or its probe is shown. As shown in FIG. 18, probe 34 of the cable to be changed is hooked up in the raised position by means of a hook 150 introduced through an opening 152 in the wall of the furnace end. Subsequently, probe 34 is extracted through this opening 152 as a result of the simultaneous unwinding of the cable 106 (see FIG. 19). On the outside of the furnace, cable 106 is severed immediately above probe 34 (see FIG. 19A), and the free end of the old cable 106 is fastened to the free end of a new cable 106a, the opposite end of which carries a new probe 34a. The fastening between the two cables 106 and 106a can be effected, as shown in FIG. 20, by means of a connection piece 154 which is sufficiently flat to be capable of passing through a cable guide tube 48. When the connection according to FIG. 20 has been completed, cable 106 is again wound completely onto its drum, taking with it the new cable 106a. When connection piece 154 appears at the level of the drum, the drum is stopped, the new cable 106a is unfastened from the old cable 106, the old cable is removed from the drum and the new cable is fastened to the drum. This method is particularly desirable in that it does not require any dismantling at the level of the control unit of the supporting arm.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for determining the profile of the charging surface of a shaft furnace including:

supporting arm means, said supporting arm means being adapted to suspend above the charging surface and comprising a substantically closed sleeve having a plurality of orifices along the length thereof, said orifices being disposed over the charging surface;

control unit means, said control unit means adapted to be located external of the shaft furnace and comprising a plurality of winding drums, each drum having driving means associated therewith;

a plurality of cable guide tube means, each of said cable guide tube means located substantially within said sleeve and communicating between one of said orifices and said control unit means;

a plurality of level probe means, each of said level probe means including a weight;

a plurality of cable means, each of said cable means connected at one end thereof to one of said level probe means and at the other end thereof to one of said winding drums, each of said cable means being located within one of said guide tube means;

said driving means adapted to actuate said winding drum to raise or lower said probe onto said charging surface;

means for measuring the winding or unwinding of said cable means from said drum; and cooling circuit means located in said supporting arm.

2. The apparatus of claim 1 including:

meahs for retaining said guide tube means within said sleeve.

3. The apparatus of claim 2 wherein said retaining means comprises:

a plurality of strut means, each of said strut means including at least one means for holding one of said guide tube means.

4. The apparatus of claim 3 wherein:

said holding means is an opening through said strut means.

5. The apparatus of claim 1 wherein:

said sleeve is substantially cylindrical.

6. The apparatus of claim 1 wherein:

each of said winding drums includes a drive shaft; and wherein;

said driving means is an electric motor.

7. The apparatus of claim 1 wherein:

each of said winding drums includes a drive shaft; and wherein;

a torquemeter for measuring torque is associated with each said driving means;

said torquemeter being adapted to measure the torque transmitted from said weight of said probe to said drum along said drive shaft.

8. The apparatus of claim 7 wherein said torquemeter comprises:

a piezo-electric transducer, said transducer automatically controlling the stopping of said driving means when said torque reaches a predetermined upper threshold and when said torque reaches a predetermined lower threshold.

9. The apparatus of claim 8 wherein:

said upper threshold corresponds to the complete raising of the weight; and said lower threshold corresponds to the moment when said weight contacts said charging surface.

10. The apparatus of claim 7 wherein said torquemeter comprises:

a cylindrical housing attached to said control unit means, said housing including first and second ends, said housing including a bore therethrough, said bore having interior shoulders defining first and second chambers;

firsr piston means mounted on a first piston rod in said bore of said housing, said first piston rod having a shoulder positioned in the vicinity of said interior bore shoulders, said first piston rod being associated exterior of said housing with said driving means;

second piston means mounted on a second piston rod in said housing bore, said second piston rod being coaxial with said first piston rod;

first compression spring means located between said first and second piston means, said first compression spring means coaxially mounted about said first piston rod;

second compression spring means located between said second piston means and a said first end of said housing wherein said second piston means is urged against said interior shoulders of said housing bore;

said first compression spring means having a spring force less than the force resulting from said probe weight;

said second compression spring means having a spring force greater than the force resulting from said probe weight; and first and second detector means mounted in said housing to detect relative positions of said first piston.

11. The apparatus of claim 1 including:

damping means associated with said probe for damping shocks occuring when said probe is raised from or lowered onto the charging surface.

12. The apparatus of claim 1 wherein said control unit means includes:

housing means, each of said drums being mounted within said housing means;

each of said drums being mounted on a drive shaft via bearing means.

13. Ihe apparatus of claim 9 including:

an elastic connection between each or said winding drums and its associated driving means.

14. The apparatus of claim 13 wherein said elastic connection comprises:

a pair of blades attached to said drive shaft, one end of each of said blades being connected by means of compression springs to said drum; and a pair of stops on the inner face of said drum, said stops communicating with said blades.

15. The apparatus of claim 11 wherein:

said driving means is an electric motor; and wherein:

said damping means comprises a double electrical supply to each motor.

16. The apparatus of claim 15 wherein:

one of said double electrical supplies to each motor is at the normal frequency of the mains; and the other of said double electrical supplies is a frequency divider common to all of said electric motors;

eacn of said motors being switched f,om said normal frequency to said frequency divider automatically via detector means wnich detect the angular position of said drum;

said switching being effected at a predetermined angular position of said drum corresponding to a predetermined distance between said probe and said supporting arm means.

17. The apparatus of claim 16 wherein said detection means comprises:

pulse generating means; and pulse counting means wherein said counting means adds pulses generated by said pulse generating means 18. The apparatus of claim 1 including:

receiving means adjacent each of said orifices for receiving said weight of said probe.

19. The apparatus Of claim 18 wherein said receiving means includes:

damping means for damping the force of said weight in said receiving means.

20. The apparatus of claim 19 wherein:

said damping means comprises spring means.

21. The apparatus of claim 1 wh rein:

said cable guide tube means are twisted within said sleeve to from two groups of tubes arranged symmetrically on either side of a mid-plane of said sleeve; and wherein:

each of said guide tube means forms about a 90 degree bend prior to communicating with one of said orifices.

22. The apparatus of claim 1 including:

helical spring means lining at least a portion of said cable guide tube means to prevent wear of said cable means.

23. The apparatus of claim 1 wherein said winding drum includes:

grooving on the outer surface thereof, said grooving adapted to accept said cable means.

24. The apparatus of claim 1 wherein said supporting arm means includes:

means for sampling gas.

25. The apparatus of claim 1 wherein said supporting arm means includes:

means for measuring temperature.

26. The apparatus of claim 1 wherein:

said supporting arm means is pivotably mounted on the wall of said shaft furnace.

27. The apparatus of claim 1 wherein:

said guide tube means communicateswith a tank containing scavenging gas under pressure, said pressure of said scavenging being higher than the pressure in the control unit means;

said pressure in the control unit means being higher than pressure in the shaft furnace.

28. The apparatus of claim 27 including:

bush means connected to each of said guide tube means, said bush means being adjacent the communication between said tube means and scavenging gas tank;

said bush means including means to create an artificial load loss wherein most of said scavanging gas is forced through said guide tube means rather than said control unit means.

29. The apparatus of claim 1 including:
cable-slack detection means.

30. The apparatus of claim 29 wherein said cable-slack detection means comprises:
rocker lever means suspended over each of said drums;
circuit breaker,means associated wth one end of said rocker lever means.

31. The apparatus of claim 19 wherein:
said detection means is mounted ata specific location over said drum; and including:
guide plate means provided near the drum to direct said cable means towards said specific location.

32. The apparatus of claim 29 wherein said cable slack detection means comprises:
proximity detector means located between each of said drums and one of said cable guide tube means associated with each of said drum.

33. The apparatus of claim 1 including:
means exterior of said shaft furnaLe for inspecting the interior of said supporting arm means.

34. The apparatus of claim 1 wherein:
said cooling circuit includes a fluid delivery tube positioned in said sleeve and coaxial wherewith.

35. A method of replacing a probe and cable means in an apparatus for determining the profile of a charging surface of a shaft furnace, the apparatus being constructed in accordance with the apparatus of claim 1, including the steps of:
hooking said old probe and associated old cable means from a location exterior of the furnace;
extracting said old probe and associated old cable means to a location exterior of the furnace;
severing said old cable means above said probe.
fast ning a first end of a new cable means to said old cable means, a second end of said new cable means being attached to a new probe;
winding said old cable means onto said winding drum until said new cable means appears near said drum;
removing said old cable means from said drum; and
fastening said new cable means to said drum.

* * * * *